United States Patent [19]
Langen

[11] Patent Number: 5,456,079
[45] Date of Patent: Oct. 10, 1995

[54] DEVICE FOR THE THERMAL REGENERATION OF PARTICLE FILTERS FOR DIESEL ENGINE EXHAUST GAS

[75] Inventor: Herbert Langen, Altbach, Germany

[73] Assignee: Firma J. Eberspächer, Essingen, Germany

[21] Appl. No.: 246,933

[22] Filed: May 20, 1994

Related U.S. Application Data

[63] Continuation of Ser. No. 942,937, Sep. 10, 1992, abandoned.

[30] Foreign Application Priority Data

Sep. 12, 1991 [DE] Germany ............................ 41 30 378.4

[51] Int. Cl.[6] .................................................. F01N 3/02
[52] U.S. Cl. .................................................. 60/286; 60/303
[58] Field of Search .......................... 60/286, 303, 311; 431/5, 18, 62, 37

[56] References Cited

U.S. PATENT DOCUMENTS

| | | | |
|---|---|---|---|
| 4,309,153 | 1/1982 | Panick et al. | 417/250 |
| 4,567,725 | 2/1986 | Shinzawa et al. | 60/286 |
| 5,193,340 | 3/1993 | Kamihara | 60/286 |

*Primary Examiner*—James C. Yeung
*Assistant Examiner*—L. Heyman
*Attorney, Agent, or Firm*—McGlew and Tuttle

[57] ABSTRACT

A device for thermal regeneration of particle filters is provided for use with a diesel engine exhaust system with a particle filter. The device includes a burner for heating the particle filter during regeneration of the particle filter. A combustion air supply is provided connected to the burner for supplying combustion air. A fuel pump arrangement is provided preferably including plural pumps which are individually actuatable to deliver fuel dependent on the speed and load condition of the diesel engine.

16 Claims, 1 Drawing Sheet

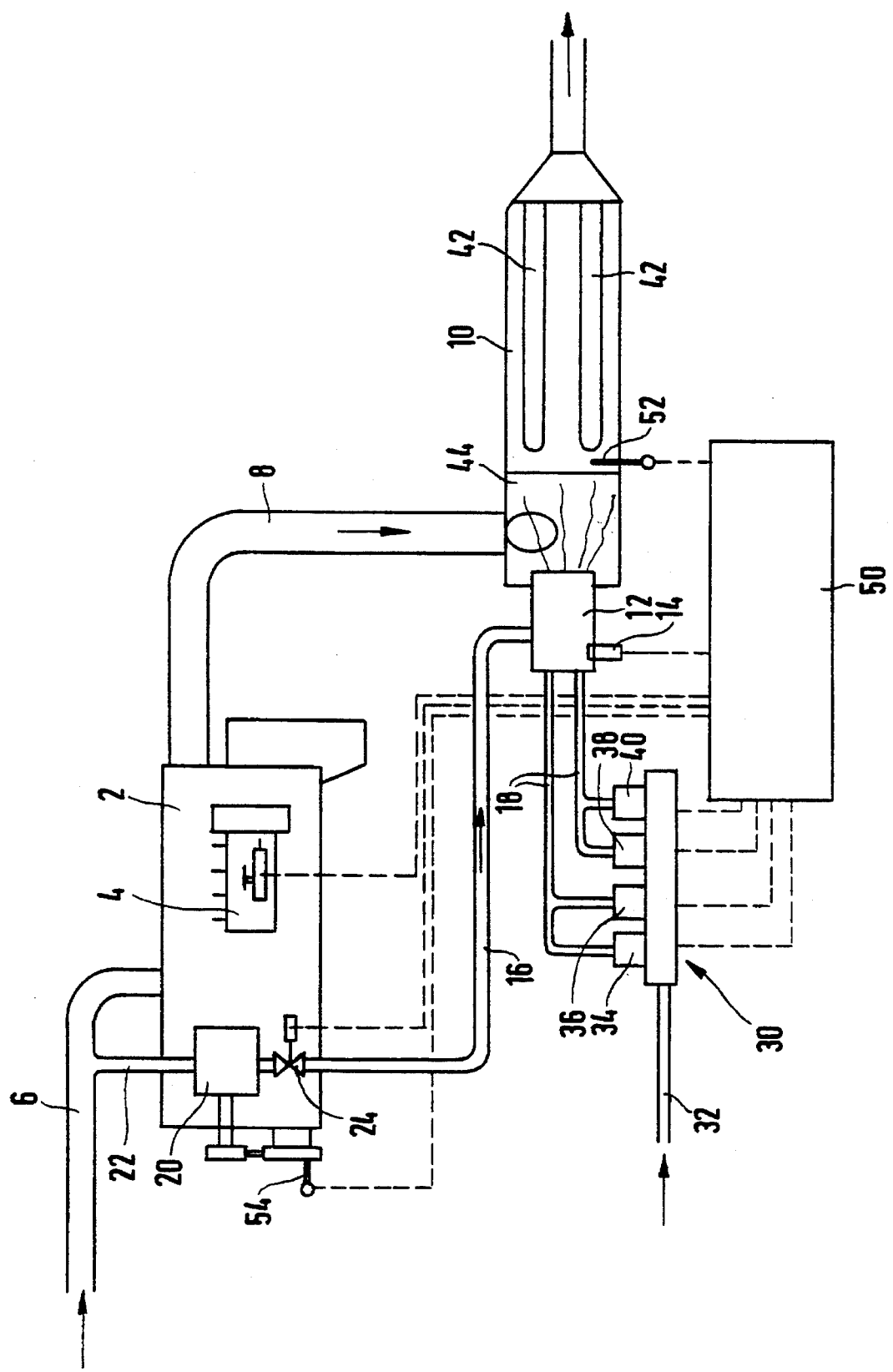

DEVICE FOR THE THERMAL REGENERATION OF PARTICLE FILTERS FOR DIESEL ENGINE EXHAUST GAS

This is a file wrapper continuation of application Ser. No. 07/942,937 filed Sep. 10, 1992 abandoned.

FIELD OF THE INVENTION

The invention relates to a device for the thermal regeneration of particle filters for diesel engine exhaust gas, comprising (a) a burner for heating the particle filter during regeneration thereof;

(b) a means for supplying combustion air to the burner; and (c) a fuel pump means for supplying fuel to the burner.

Presently endeavors are being made in many places to develop devices for removing particles—often simply referred to as soot or soot particles—from diesel engine exhaust gas. While up to now the exhaust gases of almost all diesel engines are emitted to the environment together with the particles in untreated manner, endeavors are now being made—primarily for reasons of environmental protection—to retain the particles at least to a large extent from the diesel engine exhaust gases before these gases are blown into the environment. A suitable means for retaining the particles are particle filters installed in the exhaust gas lines, which nowadays are primarily conceived to be ceramic monolith filters and ceramic yarn wound filters.

The greatest problem consists in the elimination of the particles which have been filtered out. Due to the fact that in diesel engines of motor vehicles the filters are already completely loaded with particles after a driving distance of at the most some hundred kilometers, the replacement of a loaded filter against a new filter is not a possibility that is realistic under practical aspects. Consequently, the endeavors are concentrated on finding possibilities for regeneration of loaded diesel engine exhaust gas particle filters. The most promising possibility is the thermal regeneration by burning off the particles filtered out in the loaded filter. However, for doing so, temperatures of at least approx. 600° C. are necessary in the region of the filter during regeneration. Such temperatures are present in exhaust gas at the most under full load conditions or load conditions of the diesel engine relatively close to full load so that, when the filter requires regeneration and conditions of this kind are not present, the filter must be heated to the required regeneration temperature by means of a different heat source.

Devices for the thermal regeneration of particle filters for diesel engine exhaust gas, having the features indicated in the initial paragraph, are known.

SUMMARY AND OBJECTS OF THE INVENTION

It is the object of the invention to make available a device of the type indicated at the outset, through which advantageous regeneration conditions can be achieved also with varying operating conditions of the diesel engine the exhaust gas of which is to be filtered.

To meet this object, the device according to the invention is characterized in (d) that the fuel pump means is designed such that it delivers a fuel quantity per unit of time that is dependent on the speed and/or the load condition of the diesel engine having the particle filter associated therewith.

Preferably and in the simplest embodiment of the device, the fuel pump means comprises at least one fuel pump whose delivery quantity per unit of time depends on the speed of the diesel engine. This embodiment starts from the basic idea that the amount of heat per unit of time to be supplied to the particle filter by means of the burner is primarily dependent on the exhaust gas quantity of the diesel engine per unit of time. This exhaust gas quantity is substantially proportional to the speed of the diesel engine. It is advantageous in this respect when the delivery quantity of the at least one fuel pump is substantially proportional to the speed of the diesel engine.

The afore-described dependency or proportionality of the fuel delivery quantity on or to the speed of the diesel engine, respectively, can be achieved by driving the at least one fuel pump mechanically by the diesel engine or by providing an electrically driven fuel pump with variable speed. However, according to a development of the invention it is preferred that the at least one fuel pump is an electromagnetically driven metering pump. Electromagnetically driven metering pumps are of comparatively simple and sturdy construction; they can be controlled in particularly simple manner with respect to their delivery quantity by changing the driving frequency. Furthermore, in addition to the speed of the diesel engine, further parameters can also be taken into consideration in a simple manner. In this respect, more detailed statements will still be made hereinafter.

Preferably several fuel pumps may be provided whose delivery quantities can be supplied to the burner in combined form. In this manner, the required total delivery quantity range need not be covered by one single fuel pump, but rather a second, third etc. fuel pump can be taken into operation in addition starting from one or more delivery quantity thresholds. Furthermore, when several fuel pumps are provided it is easily possible to take further parameters of the instantaneous operating condition of the diesel engine into consideration, as will still be pointed out more clearly in the following.

In a development of the invention, the means for supplying combustion air to the burner preferably comprises a compressor or air pump or blower, respectively, of such construction that it delivers a combustion air quantity per unit of time that is dependent on the speed of the diesel engine having the particle filter associated therewith and preferably is substantially proportional to the speed. This measure can be dispensed with when the means for supplying combustion air to the burner always delivers so much combustion air that sufficient combustion air is present for regeneration also when maximum fuel supply to the burner is required. However, it is more advantageous in terms of energy when—as described and preferably provided—the combustion air quantity per unit of time is at least roughly matched to the speed of the diesel engine.

To this end the compressor may be driven mechanically by the diesel engine. A further possibility consists in providing an electric variable drive for the compressor.

There are regeneration situations in which it is advantageous not to be bound to the afore-described strict dependency of the combustion air quantity delivered by the compressor on the speed of the diesel engine. Examples to be cited in this respect are the beginning of a regeneration with as rapid as possible heating of the particle filter (i.e. tendency of an as extensive as possible reduction of the combustion air quantity), high load condition of the diesel engine (i.e. diesel engine exhaust gas relatively hot, relatively low supply of heat required by means of the burner) and low load condition of the diesel engine (i.e. diesel engine exhaust gas relatively cold, relatively high supply of heat required by means of the burner, but still considerable amount of air present in the diesel engine exhaust gas). For taking such situations into account, there is preferably provided a controllable valve between the compressor and the burner for controlling the combustion air quantity fed to the burner per unit of time.

Examples of a high load condition of the diesel engine are rapid accelerations from low speeds, full load at high speed, driving uphill with a motor vehicle equipped with the diesel engine. Examples of a low load condition of the diesel engine are driving downhill, driving at uniform moderate speed and with the acceleration pedal only slightly depressed, as well as idling of the diesel engine.

In a further development of the invention, the fuel pump means preferably comprises a plurality of fuel pumps, with the number of the fuel pumps just in operation being controlled at least as a function of the load condition of the diesel engine. With this development of the invention, a further means is thus available for changing the fuel quantity delivered by the fuel pump means per unit of time. It has been pointed out hereinbefore in what concrete manner changes in the load condition of the diesel engine are caused. Changed load conditions are not necessarily tied to a changed speed, although both happens sometimes hand in hand. Rather, at one and the same speed different load conditions may be present depending on the driving requirements of the diesel engine.

The aim of an optimum regeneration of particle filters is that the required soot burning-off temperature in the region of the particle filter is reached as fast as possible at the beginning of the regeneration and that a temperature not much higher than this minimum temperature is observed as exactly as possible, independently of the instantaneous speed and the instantaneous load condition of the diesel engine. The invention discloses the means for achieving this aim. In the embodiment thereof with a particularly large functional scope, influence is exerted on the combustion air quantity flowing to the burner per unit of time (in speed-dependent manner and non-speed-dependent manner), on the fuel quantity supplied to the burner per unit of time (speed-dependent influencing of the delivery capacity of one or several fuel pumps, non-speed-dependent adjustment of the delivery capacity of one fuel pump or the number of fuel pumps in operation).

The device preferably is characterized by an electric control which during operation of the burner takes influence, as a function of the gas temperature in the region of the particle filter, on the number of the fuel pumps just in operation and/or the delivery quantity of the at least one fuel pump and/or the position of the combustion air quantity valve. The term "takes influence" was chosen in order to point out that the control mentioned may be superimposed on the described basic control via the speed of the diesel engine. However, it is also possible that the control mentioned takes over the entire control; in this case, the control preferably controls also the means for supplying combustion air to the burner with respect to the combustion air quantity delivered by it per unit of time.

The device according to the invention is preferably provided for a full flow regeneration system in which the combustion gases of the burner, during burner-supported filter regeneration, heat the engine exhaust gas to the regeneration temperature. This construction has the advantage that it is particularly uncomplicated and involves particularly little expenditure. On the other hand, a relatively high maximum burner power must be installed to this end since the entire engine exhaust gas flow must be heated to the regeneration temperature. Furthermore, the compressor must ensure a combustion gas pressure of the burner that is higher than the engine exhaust gas pressure. Also in full flow regeneration, filter regeneration normally takes place in intervals, i.e. regeneration takes place when the filter is loaded completely or almost completely.

The device according to the invention may also be constructed as a two-flow interval regeneration system in which two filters connected in parallel and a flap or gate for selectively directing the engine exhaust gas to the first or second filter are provided and in which a separate burner is provided for each filter. With this configuration, when one of the two filters is loaded completely or almost completely, the engine exhaust gas is directed by means of said gate to the other filter, and the first-mentioned filter is then thermally regenerated. When, after an additional period of operation, the other filter is loaded completely or almost completely, the process takes place the other way round.

The device according to the invention is intended primarily for driving diesel engines of motor vehicles.

The invention and developments of the invention will now be elucidated in more detail by way of an embodiment shown schematically in the drawing.

BRIEF DESCRIPTION OF THE DRAWING

The sole drawing figure depicts a motor vehicle diesel engine having a particle filter for its exhaust gas and a device for thermal regeneration of the particle filter.

DETAILED DESCRIPTION OF THE PREFERRED EMBODIMENT

The drawing schematically illustrates a diesel engine 2 drawn to a reduced scale as compared to the size ratio of the other components. The diesel engine 2 comprises an injection pump 4 driven by it and serving to supply diesel fuel into its combustion chambers. The diesel engine 2 receives combustion air through a suction line 6, either by self-suction or by means of a loader (charger). Installed in an exhaust gas line 8 of the diesel engine 2 is a particle filter 10.

On the face side and in alignment with the longitudinal axis of the particle filter 10, a burner 12 is attached to the particle filter. The burner 12 consists in essence of a combustion chamber and an electrical ignition means 14. The burner 12 is fed with combustion air through a line 16 and with fuel, e.g. diesel oil, through a double line 18.

Attached to the diesel engine 2 is a compressor 20 adapted to be driven mechanically, for instance by the crankshaft or the camshaft of the diesel engine 20 The compressor 20, via a line 22, sucks in air from the suction line 6 of the diesel engine 2 and is connected to the combustion air line 16 on its output side. Disposed in line 16 is an electrically adjustable valve 24.

Furthermore, there is provided a fuel pump means 30 connected on its input side to the fuel tank of the motor vehicle via a line 32 and on its output side to said double fuel line 18. The fuel pump means 30 consists essentially of four electromagnetically driven metering pumps 34, 36, 38, 40, all connected on the input side to line 32 and with two each thereof being connected to a common fuel line 18.

In a large part of the housing of the particle filter 10, a filter element or a plurality of filter elements 42 are disposed in spatially distributed manner. Upstream of the filter elements 42, a space 44 is provided in the housing of the particle filter 10 into which opens the combustion chamber of the burner 12 on its face side and into which opens the exhaust gas line 8 from the circumference thereof, preferably with a tangential component.

The drawing illustrates furthermore an electric or electronic control device 50. Connected to the control device 50 are:

(a) a temperature sensor 52 detecting the gas temperature in the particle filter 10, concretely in the region of the filter elements 42;

(b) a speed sensor 54 detecting the speed of the diesel engine 2 for instance on the crankshaft;

(c) the injection pump 4 of the diesel engine 2 for transmitting one or several values representative of the load condition of the diesel engine 2;

(d) the electrical ignition means 14 of the combustion chamber 12;

(e) the fuel pumps 34, 36, 38, 40;

(f) the valve 24.

The main phase of the regeneration, i.e. after conclusion of the initial heating-up operation, will now be described first. The valve 24 is fully open, for instance. The compressor 20 delivers to burner 12 a combustion air quantity per unit of time that is substantially proportional to the speed of the diesel engine 2. For instance two of the four fuel pumps 34, 36, 38, 40 are in operation, and these are driven by the control device 50 such that they deliver to the burner 12 a fuel quantity per unit of time that is substantially proportional to the speed of the diesel engine 2. Consequently, there is substantially a constant fuel/air ratio created at the burner 2 that is independent of the speed.

Superimposed on this "basic control" is a control by means of the control device 50 that takes the instantaneous load condition of the diesel engine 2 into consideration. This superimposed control may consist in that the driving frequency of the two fuel pumps in operation is modified and/or that, according to necessity, one fuel pump is taken out of operation or one or two additional fuel pumps are put in operation.

The control or regulating operation takes place under the superior influence of the temperature in the particle filter 10 detected by temperature sensor 52. The control or regulating device 50 meters the fuel quantity fed to the burner 12 per unit of time such that this temperature is at all times held in the range of approx. 650° C. to 700° C.

Upon starting a regeneration operation it is advantageous to bring the particle filter as quickly as possible to its working temperature in the range of approx. 650° C. to 700° C. To this end, the control device 50 can partly close valve 24 and/or increase the fuel delivery quantity to a higher level than would be the case in the afore-described subsequent phase of the regeneration as a function of the speed and the load condition of the diesel engine 2.

It is to be understood that the control device 50 also controls at what time a regeneration is to be started (for example due to the backpressure as a consequence of loaded filter elements 42, which is detected by means of a pressure sensor in the particle filter 10) and at what time the regeneration is concluded (for example after a duration determined on the basis of experimental values). Furthermore, it is to be understood that the control device 50 controls switching on of the ignition means 14.

Some of the functions described can also be provided separately from the control device 50. For instance, the working frequency of each one of the fuel pumps 34, 36, 38, 40 may be controlled directly on the basis of the value ascertained by the speed sensor 54 or the value or group of values ascertained at the injection pump 4 and representative of the load condition of the diesel engine 2 can be passed directly to the fuel pump means for controlling the number of fuel pumps to be operated.

I claim:

1. A device for thermal regeneration of an exhaust gas particle filter of a diesel engine, the device comprising:

a burner connected to the particle filter for heating the particle filter during regeneration thereof;

combustion air supply means for supplying combustion air to said burner;

fuel pump means for supplying fuel to said burner, said fuel pump means including a plurality of fuel pumps; and a control unit for sensing the speed and load condition of the diesel engine and controlling said pump means to vary a number of fuel pumps in operation, depending on the load condition of said diesel engine and controlling each of said pumps in operation to supply a quantity of fuel per unit time that is substantially proportional to the speed of the diesel engine.

2. A device according to claim 1, wherein at least one of said plurality of fuel pumps is an electromagnetically driven metering pump.

3. A device according to claim 1, wherein said combustion air supply means comprises a compressor connected to said diesel engine for delivering a combustion air quantity to said burner dependent on a speed of said diesel engine.

4. A device according to claim 3, wherein said compressor delivers a quantity of combustion air which is substantially proportional to a speed of said diesel engine.

5. A device according to claim 3, wherein said compressor is mechanically connected to said diesel engine for operating at a speed proportional to said speed of said diesel engine.

6. A device according to claim 1, further comprising:

a controllable valve connected to said combustion air supply means for controlling a quantity of combustion air flowing to said burner per unit of time.

7. A device according to claim 1, wherein a gas temperature sensor is connected to said particle filter for sensing a gas temperature in said particle filter, said control unit being connected to said gas temperature sensor and being connected to each of said plurality of pumps for changing the operation of selected ones of said plural pumps dependent on gas temperatures sensed by said gas temperatures sensor.

8. A device according to claim 6, wherein a gas temperature sensor is connected to said particle filter for sensing a gas temperature in said particle filter, said control unit being connected to said gas temperature sensor and being connected to said controllable valve for changing the quantity of combustion air delivered by said combustion air supply means depending upon the gas temperature sensed by said gas temperature sensor.

9. A device for thermal regeneration of an exhaust gas particle filter of a diesel engine, the device comprising:

a burner connected to the particle filter for heating the particle filter during regeneration thereof;

combustion air supply means for supplying combustion air to said burner;

fuel pump means for supplying fuel to said burner, said fuel pump means including a plurality of fuel pumps:

sensing means for sensing the speed and load condition of said diesel engine and generating engine speed and load condition signals; and a control means receiving said engine speed and load condition signals and controlling said pump means to vary a number of fuel pumps in operation, depending on the load condition of said diesel engine, and controlling each of said pumps in operation to supply a quantity of fuel per unit of time that is substantially proportional to the speed of said diesel engine.

10. A device according to claim 9, wherein said fuel pumps are each an electromagnetically driven metering pump.

11. A device according to claim 9, wherein said combustion air supply means comprises a compressor connected to said diesel engine for delivering a combustion air quantity to said burner dependent on a speed of said diesel engine.

12. A device according to claim 11, wherein said compressor delivers a quantity of combustion air which is substantially proportional to a speed of said diesel engine.

13. A device according to claim 11, wherein said compressor is mechanically connected to said diesel engine for operating at a speed proportional to said speed of said diesel engine.

14. A device according to claim 9, further comprising:

a controllable valve connected to said combustion air supply means for controlling a quantity of combustion air flowing to said burner per unit of time.

15. A device according to claim 9, wherein a gas temperature sensor is connected to said particle filter for sensing a gas temperature in said particle filter, said control unit being connected to said gas temperature sensor and being connected to each of said plurality of pumps for changing the operation of selected ones of said plural pumps dependent on gas temperatures sensed by said gas temperatures sensor.

16. A device according to claim 15, wherein a gas temperature sensor is connected to said particle filter for sensing a gas temperature in said particle filter, said control unit being connected to said gas temperature sensor and being connected to said controllable valve for changing the quantity of combustion air delivered by said combustion air supply means depending upon the gas temperature sensed by said gas temperature sensor.

* * * * *